United States Patent
Jhang et al.

(10) Patent No.: US 10,775,351 B2
(45) Date of Patent: Sep. 15, 2020

(54) APPARATUS FOR ASSESSING DEGRADATION AND ESTIMATING STRENGTH BY USING ULTRASOUND AND METHOD FOR ASSESSING DEGRADATION AND ESTIMATING STRENGTH USING THE SAME

(71) Applicant: INDUSTRY-UNIVERSITY COOPERATION FOUNDATION OF HANYANG UNIVERSITY, Seoul (KR)

(72) Inventors: Kyung Young Jhang, Seoul (KR); Jong Beom Kim, Seoul (KR)

(73) Assignee: INDUSTRY-UNIVERSITY COOPERATION FOUNDATION OF HANYANG UNIVERSITY, Seoul (KR)

( * ) Notice: Subject to any disclaimer, the term of this patent is extended or adjusted under 35 U.S.C. 154(b) by 366 days.

(21) Appl. No.: 15/314,334

(22) PCT Filed: Apr. 30, 2015

(86) PCT No.: PCT/KR2015/004443
§ 371 (c)(1),
(2) Date: Nov. 28, 2016

(87) PCT Pub. No.: WO2015/182891
PCT Pub. Date: Dec. 3, 2015

(65) Prior Publication Data
US 2017/0191967 A1    Jul. 6, 2017

(30) Foreign Application Priority Data

| May 28, 2014 | (KR) | 10-2014-0064301 |
| Sep. 15, 2014 | (KR) | 10-2014-0122307 |

(Continued)

(51) Int. Cl.
*G01N 29/12* (2006.01)
*G01H 1/00* (2006.01)
(Continued)

(52) U.S. Cl.
CPC ............ *G01N 29/12* (2013.01); *G01H 17/00* (2013.01); *G01N 29/07* (2013.01); *G01N 29/24* (2013.01);
(Continued)

(58) Field of Classification Search
CPC .............................. G01N 29/12; G01H 17/00
See application file for complete search history.

(56) References Cited

U.S. PATENT DOCUMENTS

| 6,109,108 A * | 8/2000 | Ohtani | B06B 1/04 |
| | | | 73/599 |
| 9,880,133 B1 * | 1/2018 | Stephanou | G01N 29/04 |

(Continued)

FOREIGN PATENT DOCUMENTS

| CN | 1605862 A | 4/2005 |
| CN | 1980606 A | 6/2007 |

(Continued)

OTHER PUBLICATIONS

Ciampa et al, 'Non-destructive testing techniques based on nonlinear methods for assessment of debonding in single lap joints' Proceedings of SPIE—The International Society for Optical Engineering, vol. 943706, pp. 1-12 (Year: 2015).*

(Continued)

*Primary Examiner* — Lisa E Peters
(74) *Attorney, Agent, or Firm* — Novick, Kim & Lee, PLLC; Sang Ho Lee (57) ABSTRACT

Provided is an apparatus for assessing degradation and estimating strength by using ultrasound, in which the apparatus includes: an ultrasound transmitting unit making an (Continued)

ultrasound signal having a single frequency be incident in an inspected object; an ultrasound receiving unit receiving the ultrasound signal penetrating the inspected object or reflected on the inspected object; a signal processing unit calculating a propagation speed through a time interval of the ultrasound signal received by the ultrasound receiving unit and separates the received ultrasound signal into a fundamental frequency component and a harmonic component to calculate non-linear parameter, and measuring linear and non-linear elastic coefficients by using the propagation speed and the non-linear parameter; and a strength estimating unit obtaining a tensile curve by using the linear and non-linear elastic coefficients and estimating at least one of tensile strength and yield strength by using the tensile curve.

14 Claims, 6 Drawing Sheets

(30) Foreign Application Priority Data

Dec. 11, 2014 (KR) .......... 10-2014-0178752
Apr. 15, 2015 (KR) .......... 10-2015-0053382

(51) Int. Cl.
| | |
|---|---|
| G01N 29/07 | (2006.01) |
| G01N 29/34 | (2006.01) |
| G01N 29/44 | (2006.01) |
| G01N 29/36 | (2006.01) |
| G01N 29/24 | (2006.01) |
| G01N 29/46 | (2006.01) |
| G01H 17/00 | (2006.01) |

(52) U.S. Cl.
CPC .......... *G01N 29/348* (2013.01); *G01N 29/36* (2013.01); *G01N 29/44* (2013.01); *G01N 29/4472* (2013.01); *G01N 29/46* (2013.01); *G01N 2291/0258* (2013.01); *G01N 2291/02491* (2013.01); *G01N 2291/02827* (2013.01); *G01N 2291/044* (2013.01)

(56) References Cited

U.S. PATENT DOCUMENTS

| | | | |
|---|---|---|---|
| 2004/0034304 A1* | 2/2004 | Sumi ............... | A61B 8/08 600/439 |
| 2007/0016038 A1* | 1/2007 | Lynch ............... | A61B 8/0875 600/438 |
| 2007/0125174 A1* | 6/2007 | Ramaswamy ........ | G01N 3/56 73/579 |

FOREIGN PATENT DOCUMENTS

| | | |
|---|---|---|
| CN | 101650284 A | 2/2010 |
| CN | 101806778 A | 8/2010 |
| CN | 103109175 A | 5/2013 |
| CN | 103713052 A | 4/2014 |
| JP | S57-63446 A | 4/1982 |
| JP | S63-246654 A | 10/1988 |
| JP | 2964315 B2 | 10/1999 |
| JP | 2006343203 A | 12/2006 |
| JP | 2007-155730 A | 6/2007 |
| JP | 4818786 B2 | 11/2011 |
| JP | 2013250154 A | 12/2013 |
| KR | 10-2003-0066348 A | 8/2003 |
| KR | 10-2004-0047341 A | 6/2004 |
| KR | 10-2010-0072820 A | 7/2010 |
| KR | 10-2011-0018794 A | 2/2011 |
| KR | 10-2012-0031674 A | 4/2012 |
| KR | 20120117119 A | 10/2012 |
| KR | 10-2012-0126425 A | 11/2012 |
| KR | 10-2012-0139216 A | 12/2012 |
| KR | 10-1227295 B1 | 1/2013 |
| KR | 10-2013-0017396 A | 2/2013 |
| KR | 10-1257203 B1 | 4/2013 |
| KR | 10-1398776 B1 | 5/2014 |
| KR | 10-1452442 B1 | 10/2014 |

OTHER PUBLICATIONS

Mondal, Chandan "A study on precipitation characteristics induced strength variation by nonlinear ultrasonic parameter", Journal of Applied Physics, Dec. 29, 2010, 7 pages, 108, Defence Metallurgical Research Laboratory, Kanchanbagh, Hyderabad 500058, India (2010).

Jeong, Hyunjo et al., "Estimation of Fracture Toughness Degradation of High Temperature Materials by Nonlinear Acoustic Effects" Journal of the Korean Society for Nondestructive Testing, vol. 20, No. 5, pp. 424-430 (Oct. 2000).

Li Weibin et al., Study of Ultrasonic Nonlinearity in Heat-Treated Material, Transactions of the Korean Society of Mechanical Engineers "A" journal, 2010, vol. 34, No. 6 pp. 751-756, DOI: 10.3795! KSME-A.2010.34.6.751, KSME, South Korea.

Jongbeom Kim et al., Evaluation of Ultrasonic Nonlinear Characteristics in Artificially Aged A16061-T6, Journal of the Korean Society for Nondestructive Testing, 2014, vol. 34 No. 3 220-225, ISSN 225-7842, Korean Society for Nondestructive Testing, South Korea.

* cited by examiner

APPARATUS FOR ASSESSING DEGRADATION AND ESTIMATING STRENGTH BY USING ULTRASOUND AND METHOD FOR ASSESSING DEGRADATION AND ESTIMATING STRENGTH USING THE SAME

TECHNICAL FIELD

The present disclosure relates to an apparatus for assessing degradation and estimating strength by using ultrasound and a method for assessing degradation and estimating strength using the same.

BACKGROUND ART

In recent years, a research into an assessment apparatus which calculates an ultrasonic non-linear parameter by using the amplitude of a fundamental frequency and the amplitude of a harmonic frequency of ultrasound penetrating an inspected object by making the ultrasound be incident in the inspected object and assesses a change in physical property of the inspected object by using the calculated ultrasonic non-linear parameter has been in active progress.

However, when the inspected object is heat-treated and the inspected object is thus degraded, precipitates are generated and thereafter, the precipitates are grown and coupled, and dissoluted and the ultrasonic non-linear parameter also increases and decreases according to the nucleation and growth of the precipitates.

Accordingly, it is difficult to measure clearly and accurately a degradation degree of the inspected object by using the assessment apparatus in the related art. That is, when the inspected object is degraded, the ultrasonic non-linear parameter also increases and decreases as the quantity of precipitates increases and decreases and since the assessment apparatuses in the related art can measure the degradation degree of the inspected object based on only the ultrasonic non-linear parameter at a specific time, the degradation degree may be ambiguous and inaccurate.

Meanwhile, a propagation speed of an elastic wave in a solid is determined by physical properties such as an elastic coefficient, a density, and a Poisson's ratio of a propagation medium. Accordingly, the elastic coefficient of the propagation medium is acquired by measuring the propagation speed of the elastic wave to estimate the physical properties of the propagation medium. A method for acquiring the elastic coefficient of the propagation medium includes a linear elastic coefficient measuring method that measures the propagation speed of the ultrasound by using the ultrasound which belongs to the elastic wave to calculate a liner elastic coefficient.

However, there is a disadvantage in that a minute change and degradation of a micro characteristic or an elastic property of the propagation medium cannot be evaluated by the linear elastic coefficient measuring method. As a method for remedying such a disadvantage, a theoretical research into a correlation between the ultrasonic non-linear parameter and the non-linear elastic coefficient is performed.

As a result of the research, a relationship between a 2nd order ultrasonic non-linear parameter and a 2nd order non-linear elastic coefficient is verified. As described above, the correlation between the 2nd order ultrasonic non-linear parameter and the 2nd order non-linear elastic coefficient is researched, but a research into 3rd or high order ultrasonic non-linear parameters and 3rd or high order non-linear elastic coefficients is not made.

As associated prior art, Korean Patent Laid-open Publication No. 10-2012-0031674 (Title of Disclosure: System and Apparatus for Measuring Non-linearity of Ultrasonic Wave, Apr. 4, 2012) is provided.

DISCLOSURE

Technical Problem

An object to be achieved by the present disclosure is to provide an apparatus for assessing degradation and estimating strength by using ultrasound, and a method for assessing degradation and estimating strength using the same which can quantitatively assess degradation of an inspected object by using the ultrasound and estimate the strength of the inspected object by a non-destruction method.

The objects to be solved by the present disclosure are not limited to the aforementioned object(s), and other object(s), which are not mentioned above, will be apparent to a person having ordinary skill in the art from the following description.

Technical Solution

According to another aspect of the present disclosure, there is provided an apparatus for assessing degradation and estimating strength by using ultrasound, including: an ultrasound transmitting unit making an ultrasound signal having a single frequency be incident in an inspected object; an ultrasound receiving unit receiving the ultrasound signal penetrating the inspected object or reflected on the inspected object; a signal processing unit calculating a propagation speed through a time interval of the ultrasound signal received by the ultrasound receiving unit and separates the received ultrasound signal into a fundamental frequency component and a harmonic component to calculate non-linear parameter, and measuring linear and non-linear elastic coefficients by using the propagation speed and the non-linear parameter; and a strength estimating unit obtaining a tensile curve by using the linear and non-linear elastic coefficients and estimating at least one of tensile strength and yield strength by using the tensile curve.

The signal processing unit may measure a 2nd order non-linear parameter, a 3rd order non-linear parameter, and a linear elastic coefficient by controlling the ultrasound transmitting unit and the ultrasound receiving unit and measure a 2nd order non-linear elastic coefficient and a 3rd order non-linear elastic coefficient by using the 2nd order 2nd order non-linear parameter, the 3rd order non-linear parameter, and the linear elastic coefficient, and the strength estimating unit may obtain the tensile curve by using the linear elastic coefficient, the 2nd order non-linear elastic coefficient, and the 3rd order non-linear elastic coefficient or obtains the tensile curve by using the linear elastic coefficient, the 2nd order non-linear parameter, and the 3rd order non-linear parameter.

The signal processing unit may estimate an absolute non-linear parameter of the inspected object by using a ratio of relative non-linear parameters of a reference sample and the inspected object and the absolute non-linear parameter of the reference sample and measures the linear and non-linear elastic coefficients of the inspected object by using the propagation speed and the absolute non-linear parameter.

The ratio of the relative non-linear parameter may be calculated through an operation of dividing the relative non-linear parameter of the inspected object by the relative non-linear parameter of the reference sample.

The strength estimating unit may estimate the tensile strength from a maximum value of the tensile curve.

The strength estimating unit may estimate the yield strength by applying 0.2% offset to the tensile curve.

The apparatus may further include a degradation assessing unit assessing a damage time of the inspected object based on an accumulated non-linear parameter calculated by accumulating a variation amount of the non-linear parameter.

The signal processing unit may obtain the non-linear parameter of the ultrasound signal received by the ultrasound receiving unit depending on the time and accumulates the variation amount of the non-linear parameter to calculate the accumulated non-linear parameter.

According to another aspect of the present disclosure, there is provided an apparatus for assessing degradation and estimating strength by using ultrasound, including: an ultrasound transmitting unit making an ultrasound signal having a single frequency be incident in an inspected object; an ultrasound receiving unit receiving the ultrasound signal penetrating the inspected object or reflected on the inspected object; a signal processing unit obtaining the non-linear parameter of the ultrasound signal received by the ultrasound receiving unit depending on the time and accumulating the variation amount of the non-linear parameter to calculate the accumulated non-linear parameter; and a degradation assessing unit assessing a damage time of the inspected object based on the accumulated non-linear parameters.

According to another aspect of the present disclosure, there is provided a method for assessing degradation and estimating strength by using ultrasound, including: making an ultrasound signal having a single frequency be incident in an inspected object; receiving the ultrasound signal penetrating the inspected object or reflected on the inspected object; calculating a propagation speed through a time interval of the received ultrasound signal; separating the received ultrasound signal into a fundamental frequency component and a harmonic component to calculate non-linear parameter; measuring linear and non-linear elastic coefficients by using the propagation speed and the non-linear parameter; obtaining a tensile curve by using the linear and non-linear elastic coefficients; and estimating at least one of tensile strength and yield strength by using the tensile curve.

The calculating of the non-linear parameter may include separating the received ultrasound signal into a fundamental frequency component and a harmonic component to calculate a 2nd order non-linear parameter and a 3rd order non-linear parameter, the measuring of the linear and non-linear elastic coefficients may include measuring a linear elastic coefficient based on the propagation speed, and measuring a 2nd order non-linear elastic coefficient and a 3rd order non-linear elastic coefficient by using the 2nd order non-linear parameter, the 3rd order non-linear parameter, and the linear elastic coefficient, and the obtaining of the tensile curve may include obtaining the tensile curve by using the linear elastic coefficient, the 2nd order non-linear elastic coefficient, and the 3rd order non-linear elastic coefficient, and obtaining the tensile curve by using the linear elastic coefficient, the 2nd order non-linear parameter, and the 3rd order non-linear parameter.

The measuring of the linear and non-linear elastic coefficients may include estimating an absolute non-linear parameter of the inspected object by using a ratio of relative non-linear parameters of a reference sample and the inspected object and the absolute non-linear parameter of the reference sample, and measuring the linear and non-linear elastic coefficients by using the propagation speed and the absolute non-linear parameter.

The estimating may include estimating the tensile strength from a maximum value of the tensile curve.

The estimating may include estimating the yield strength by applying 0.2% offset to the tensile curve.

The method may further include calculating accumulated non-linear parameters by accumulating a variation amount of the non-linear parameter; and assessing a damage time of the inspected object based on the accumulated non-linear parameters.

Detailed contents of other exemplary embodiments are included in the detailed description and the accompanying drawings.

Advantageous Effects

According to exemplary embodiments of the present disclosure, tensile characteristics (tensile strength, yield strength, and the like) of a material which can be acquired in a destruction test such as a tensile test are assessed by using a linear/non-linear elastic coefficient from ultrasound signals to precisely diagnose degradation such as deterioration of a strength characteristic and the strength of the material without performing the tensile test.

According to the exemplary embodiments of the present disclosure, when an apparatus for assessing degradation and estimating strength by using ultrasound is installed in a structure and used, the strength deterioration with time elapsed can be continuously monitored, and as a result, the technique can be used as a structural health monitoring (SHM) technique.

BEST MODE

Advantages and features of the present disclosure, and methods for accomplishing the same will be more clearly understood from exemplary embodiments described below with reference to the accompanying drawings. However, the present disclosure is not limited to the exemplary embodiments set forth below, and may be embodied in various different forms. The present exemplary embodiments are just for rendering the description of the present disclosure complete and are set forth to provide a complete understanding of the scope of the disclosure to a person with ordinary skill in the technical field to which the present disclosure pertains, and the present disclosure will only be defined by the scope of the claims. Like reference numerals denote like elements throughout the present specification.

Hereinafter, exemplary embodiments of the present disclosure will be described in detail with reference to the accompanying drawings.

Figure 1:
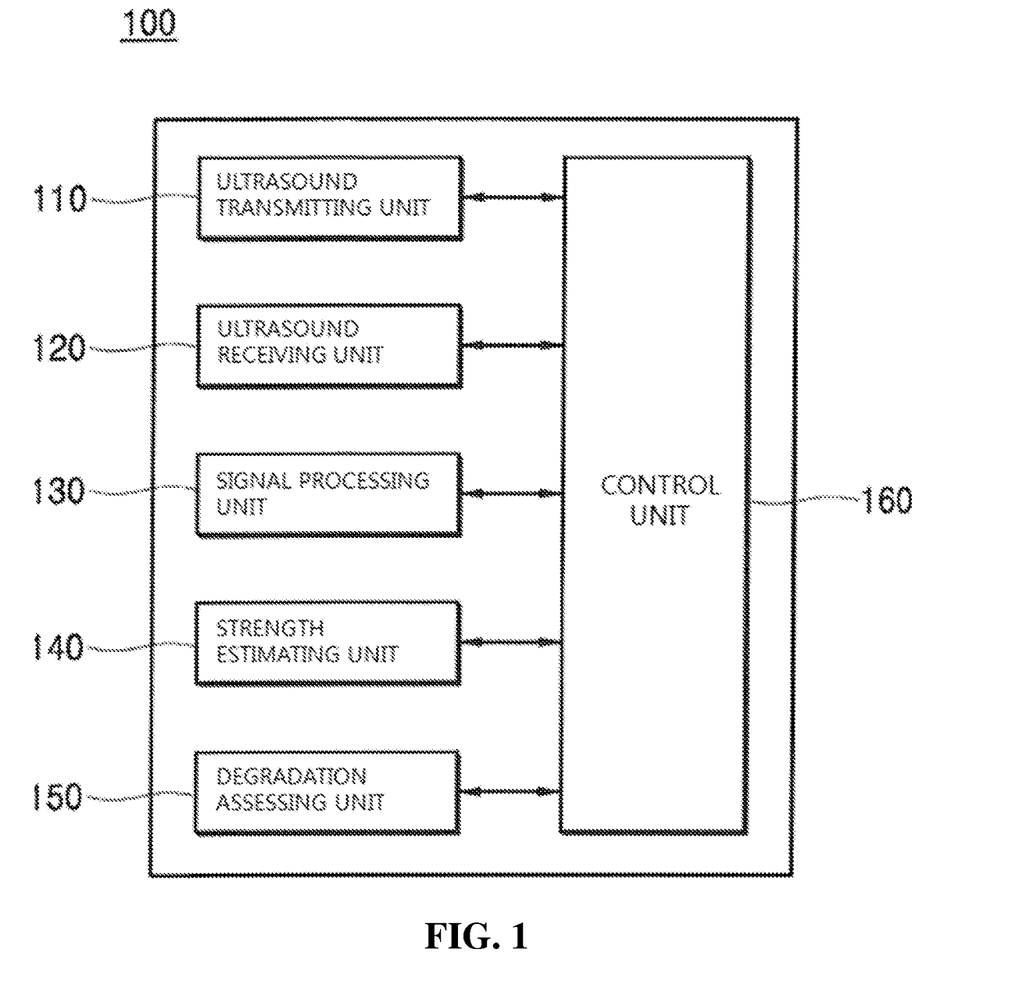
FIG. 1 is a block diagram illustrated for describing an apparatus for assessing degradation and estimating strength by using ultrasound according to an exemplary embodiment of the present disclosure.

FIG. 1 is a block diagram illustrated for describing an apparatus for assessing degradation and estimating strength by using ultrasound according to an exemplary embodiment of the present disclosure.

Referring to FIG. 1, an apparatus 100 for assessing degradation and estimating strength by using ultrasound according to an exemplary embodiment of the present disclosure may include an ultrasound transmitting unit 110, an ultrasound receiving unit 120, a signal processing unit 130, a strength estimating unit 140, a degradation assessing unit 150, and a control unit 160.

The ultrasound transmitting unit 110 makes an ultrasound signal having a single frequency be incident in an inspected object.

The ultrasound receiving unit 120 receives the ultrasound signal penetrating the inspected object or reflected on the inspected object.

Since the ultrasound transmitting unit 110 and the ultrasound receiving unit 120 are generally known, description thereof will be omitted.

The signal processing unit 130 calculates a propagation speed through a time interval of the ultrasound signal received by the ultrasound receiving unit 120 and separates the received ultrasound signal into a fundamental frequency component and a harmonic component.

The signal processing unit 130 acquires the amplitude of the fundamental frequency component and the amplitude of the harmonic component and substitutes the acquired amplitudes in Equation 1 given below to calculate a (2nd order) non-linear parameter.

$$\beta = \frac{8A_2}{A_1^2 k^2 x} \qquad \text{[Equation 1]}$$

Where, $\beta$ represents the (2nd order) non-linear parameter, $A_1$ represents an amplitude of the fundamental frequency component and $A_2$ represents the amplitude of the harmonic component. Further, k represents a wave number and x represents a propagation distance.

The signal processing unit 130 measures linear and non-linear elastic coefficients by using the propagation speed and the non-linear parameter.

In detail, the signal processing unit 130 may measure a 2nd order non-linear parameter, a 3rd order non-linear parameter, and a linear elastic coefficient by controlling the ultrasound transmitting unit 110 and the ultrasound receiving unit 120 and measure a 2nd order non-linear elastic coefficient and a 3rd order non-linear elastic coefficient by using the 2nd order non-linear parameter, the 3rd order non-linear parameter, and the linear elastic coefficient.

The 2nd order non-linear parameter may be measured by Equation 1 given above.

The 3rd order non-linear parameter may be measured by Equation 2 given below.

That is, the signal processing unit 130 acquires the amplitudes of the fundamental frequency component and a 3rd order harmonic component separated from the ultrasound signal received by the ultrasound receiving unit 120 and substitutes the acquired amplitudes in Equation 2 given below to measure the 3rd order non-linear parameter.

$$\gamma = \frac{32 A_3}{A_1^3 k^4 x^2} \qquad \text{[Equation 2]}$$

Herein, $\gamma$ represents the 3rd order non-linear parameter, $A_1$ represents the amplitude of the fundamental frequency component, $A_3$ represents the amplitude of the harmonic component, k represents the wave number, and x represents the propagation distance. The 3rd order non-linear parameter satisfies a relationship of Equation 3 given below with the 2nd order non-linear parameter.

$$\gamma = \beta^2 \qquad \text{[Equation 3]}$$

The linear elastic coefficient may be measured by Equation 4 given below.

That is, the signal processing unit 130 measures a longitudinal wave propagation speed and a traverse wave propagation speed of the ultrasound signal received by the ultrasound receiving unit 120 and substitutes the propagation speeds in Equation 4 given below to measure the linear elastic coefficient of the inspected object.

$$E = \rho \left( \frac{4 C_s^4 - 3 C_L^2 C_S^2}{2 C_s^2 - 2 C_L^2} \right) \qquad \text{[Equation 4]}$$

Where, E represents the linear elastic coefficient, $\rho$ a density of a propagation medium, $C_L$ represents the traverse wave propagation speed of the ultrasound, and $C_S$ represents the longitudinal wave propagation speed.

The 2nd order non-linear elastic coefficient may be measured by Equation 5 given below.

That is, the signal processing unit 130 substitutes the 2nd order non-linear parameter and the linear elastic coefficient in Equation 5 given below to measure the 3rd 2nd order non-linear elastic coefficient.

$$F = \beta E \qquad \text{[Equation 5]}$$

Where, F represents the 2nd order non-linear elastic coefficient, $\beta$ represents the 2nd order non-linear parameter, and E represents the linear elastic coefficient.

The 3rd order non-linear elastic coefficient may be measured by Equation 6 given below.

A relationship between the 3rd order non-linear elastic coefficient and the 3rd order non-linear parameter may be expressed as the 3rd order non-linear elastic coefficient and the 2nd order non-linear parameter as exhibited in Equation 6 given below.

Accordingly, the signal processing unit 130 substitutes the linear elastic coefficient and the 2nd order non-linear parameter in Equation 6 given below to measure the 3rd order non-linear elastic coefficient.

$$G = \frac{1}{2} \gamma E = \frac{1}{2} \beta^2 E \qquad \text{[Equation 6]}$$

Where, G represents the 3rd order non-linear elastic coefficient and γ represents the 3rd order non-linear parameter. Further, E represents the linear elastic coefficient and β represents the 2nd order non-linear parameter.

Meanwhile, as another exemplary embodiment, the signal processing unit 130 may estimate an absolute non-linear parameter of the inspected object by using a ratio of relative non-linear parameters of a reference sample and the inspected object and the absolute non-linear parameter of the reference sample. The signal processing unit 130 may measure the linear and non-linear elastic coefficients by using the propagation speed and the absolute non-linear parameter.

Herein, the ratio of the relative non-linear parameter of the inspected object may be calculated through an operation of dividing the relative non-linear parameter of the inspected object by the relative non-linear parameter of the reference sample.

A process of estimating the absolute non-linear parameter of the inspected object will be described below.

That is, the signal processing unit 130 separates the received ultrasound signal into the fundamental frequency component and a secondary harmonic component by using a band pass filter to measure the relative non-linear parameters of the reference sample and the inspected object. The signal processing unit 130 applies the fundamental frequency component and the secondary harmonic component to a non-linear parameter equation (Equation 7) given below to measure the relative non-linear parameter values of the reference sample and the inspected object.

$$\beta' = \frac{A_2}{A_1^2} \quad \text{[Equation 7]}$$

Where, β' represents the (2nd order) non-linear parameter, $A_1$ represents the amplitude of the fundamental frequency component, and $A_2$ represents the amplitude of the 2nd order harmonic component, respectively.

Next, the signal processing unit 130 may calculate the ratio of the relative non-linear parameters of the reference sample and the inspected object through an operation of dividing the relative non-linear parameter by the relative non-linear parameter of the reference sample as exhibited in Equation 8 given below.

$$r_\beta = \frac{\beta'}{\beta_0'} \quad \text{[Equation 8]}$$

Where, $r_\beta$ represents the ratio of the relative non-linear parameter value, $\beta_0'$ represents the relative non-linear parameter value of the reference sample, and β' represents the relative non-liner parameter value of the inspected object.

Next, the signal processing unit 130 may estimate the absolute non-linear parameter of the inspected object by using the calculated ratio of the relative non-linear parameters and the absolute non-linear parameter of the reference sample.

In this case, the signal processing unit 130 may estimate the absolute non-linear parameter of the inspected object through an operation of multiplying the calculated ratio of the relative non-linear parameters by the absolute non-linear parameter of the reference sample as exhibited in Equation 9 given below. As a result, according to the exemplary embodiment of the present disclosure, the estimated absolute non-linear parameter of the inspected object may be acquired as the non-linear parameter of the ultrasound signal.

$$\beta = \beta_0 \cdot r_\beta \quad \text{[Equation 9]}$$

Where, β represents the absolute non-linear parameter of the inspected object, $\beta_0$ represents the absolute non-linear parameter value, and $r_\beta$ represent the ratio of the relative non-linear parameter values.

The strength estimating unit 140 obtains a tensile curve by using the linear and non-linear elastic coefficients and estimates at least one of tensile strength and yield strength by using the tensile curve.

That is, the strength estimating unit 140 substitutes the linear elastic coefficient, the 2nd order non-linear elastic coefficient, and the 3rd order non-linear elastic coefficient in Equation 10 given below to obtain the tensile curve and contrary to this, substitutes the linear elastic coefficient, the 2nd order non-linear parameter, and the 3rd order non-linear parameter in Equation 11 given below to obtain the tensile curve.

$$\sigma = E\varepsilon - \frac{1}{2}F\varepsilon^2 + \frac{1}{6}G\varepsilon^3 + \ldots \quad \text{[Equation 10]}$$

Where, σ represents stress and ε represents deformation rate. Further, E represents the linear elastic coefficient, F represents the 2nd order non-linear elastic coefficient, and G represents the 3rd order non-linear elastic coefficient.

$$\sigma = E\varepsilon\left(1 - \frac{1}{2}\beta\varepsilon + \frac{1}{3}\gamma\varepsilon^2 + \ldots\right) \quad \text{[Equation 11]}$$

Where, σ the represents stress and ε represents the deformation rate. In addition, β represents the 2nd order non-linear parameter and γ represents the 3rd order non-linear parameter.

Figure 4:
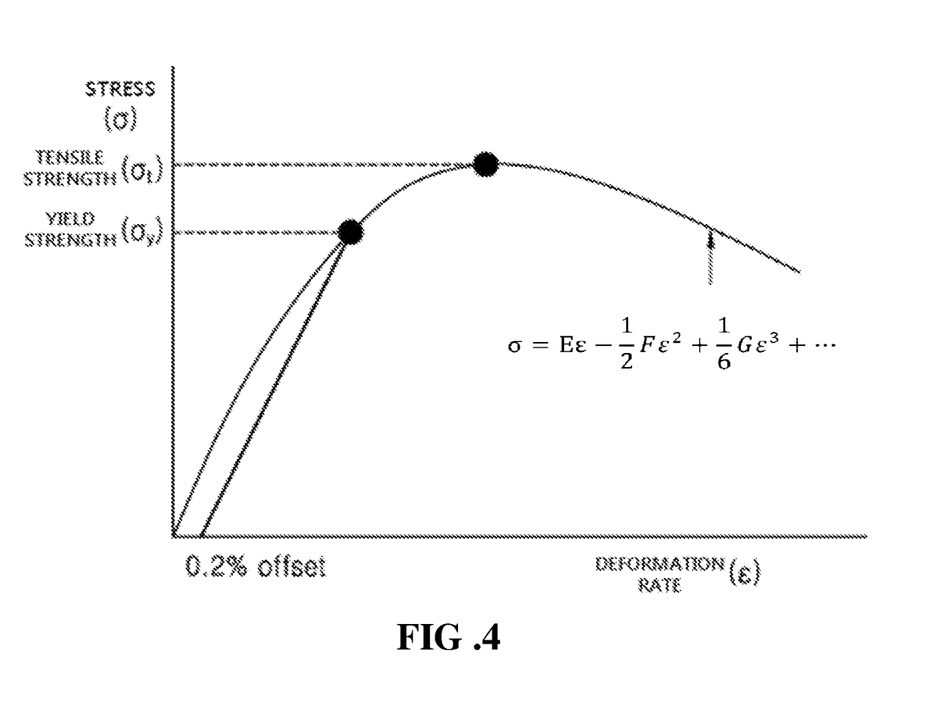
FIG. 4 is a diagram illustrated for describing one example of estimating tensile strength, yield strength, and the like through a tensile curve according to an exemplary embodiment of the present disclosure.

The strength estimating unit 140 may estimate the tensile strength from a maximum value of the tensile curve and estimate the yield strength by applying 0.2% offset to the tensile curve as illustrated in FIG. 4.

The degradation assessing unit 150 may assess a damage time of the inspected object based on an accumulated non-linear parameter calculated by accumulating a variation amount of the non-linear parameter.

To this end, the signal processing unit 130 obtains the non-linear parameter of the ultrasound signal received by the ultrasound receiving unit 120 depending on the time and accumulates the variation amount of the non-linear parameter to calculate the accumulated non-linear parameter.

That is, the signal processing unit 130 substitutes an initial non-linear parameter and the variation amount of the non-linear parameter in Equation 12 given below to calculate the accumulated non-linear parameter.

$$\beta_c = \beta_0 + \Sigma|\Delta\beta| \quad \text{[Equation 12]}$$

Where, $\beta_c$ represents the accumulated non-linear parameter, $\beta_0$ represents the initial non-linear parameter, and $\beta_A$ represents the variation amount of the non-linear parameter depending on the time. For reference, when the material is heat-treated, βc of Equation 12 may be substituted even in Equation 11.

When the accumulated non-linear parameters $\beta_c$ are the same as each other even though high-temperature degradation is performed at different heat-treatment temperatures, the degradation assessing unit 150 determines that the same damage is given, and as a result, the degradation assessing unit 150 may determine a damage degree of the material (inspected object) and assess the damage time of the inspected object through the accumulated non-linear parameters.

Figure 2:
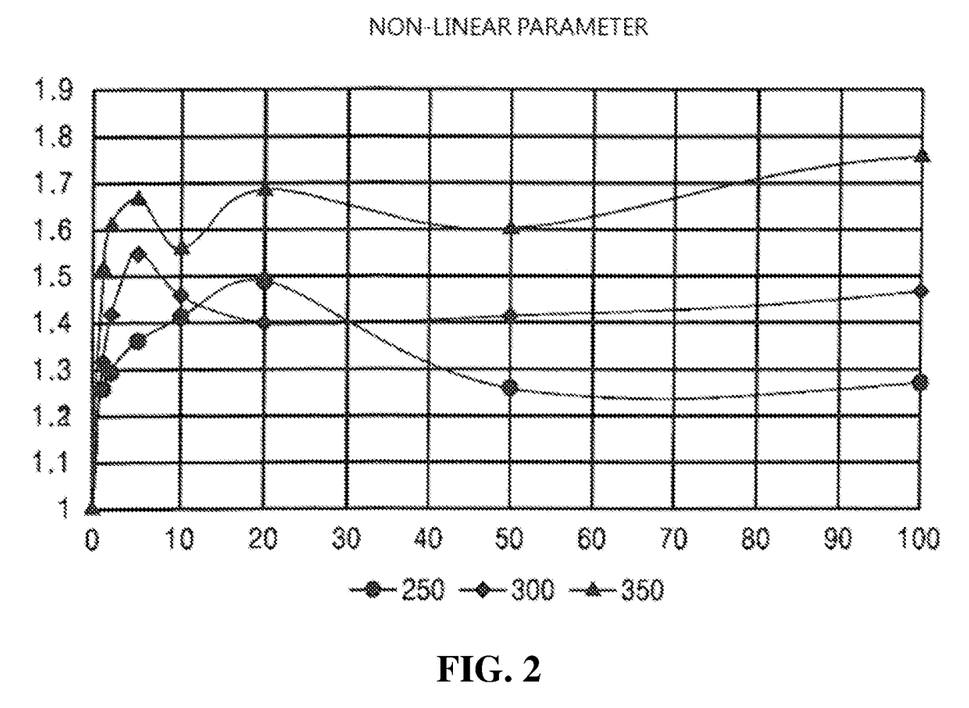
FIG. 2 is a graph illustrating an experimental result of measuring a non-linear parameter depending on a heat treatment time of an aluminum alloy in an exemplary embodiment of the present disclosure.
Figure 3:
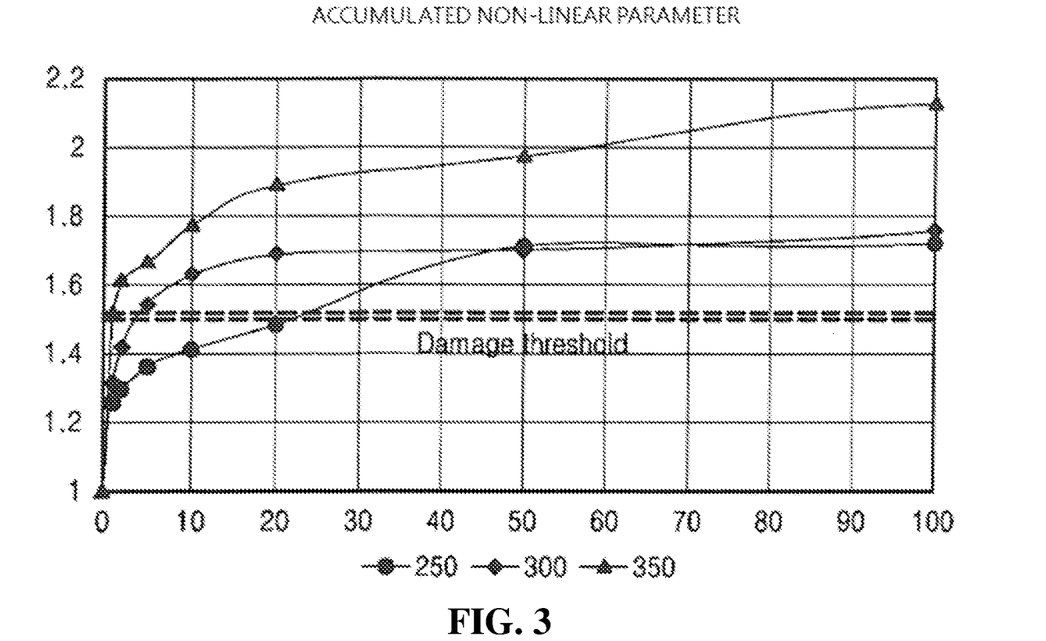
FIG. 3 is a graph illustrating an experimental result of measuring an accumulated non-linear parameter depending on a heat treatment time of an aluminum alloy in an exemplary embodiment of the present disclosure.

In the exemplary embodiment of the present disclosure, as illustrated in FIG. 2, the non-linear parameter depending on a heat-treatment time of the aluminum alloy is measured and as illustrated in FIG. 3, as a result of an experiment that acquires the accumulated non-linear parameters depending on the heat-treatment time of the aluminum alloy, when the accumulated non-linear parameters is the same, it may be determined that the same damage is given.

As a result, the degradation assessing unit 150 may determine the damage degree of the material (inspected object) and assess the damage time of the inspected object based on the accumulated non-linear parameters.

The control unit 160 may generally control operations of the apparatus 100 for assessing degradation and estimating strength by using ultrasound according to the exemplary embodiment of the present disclosure, that is, the ultrasound transmitting unit 110, the ultrasound receiving unit 120, the signal processing unit 130, the strength estimating unit 140, the degradation assessing unit 150, and the like.

Figure 5:
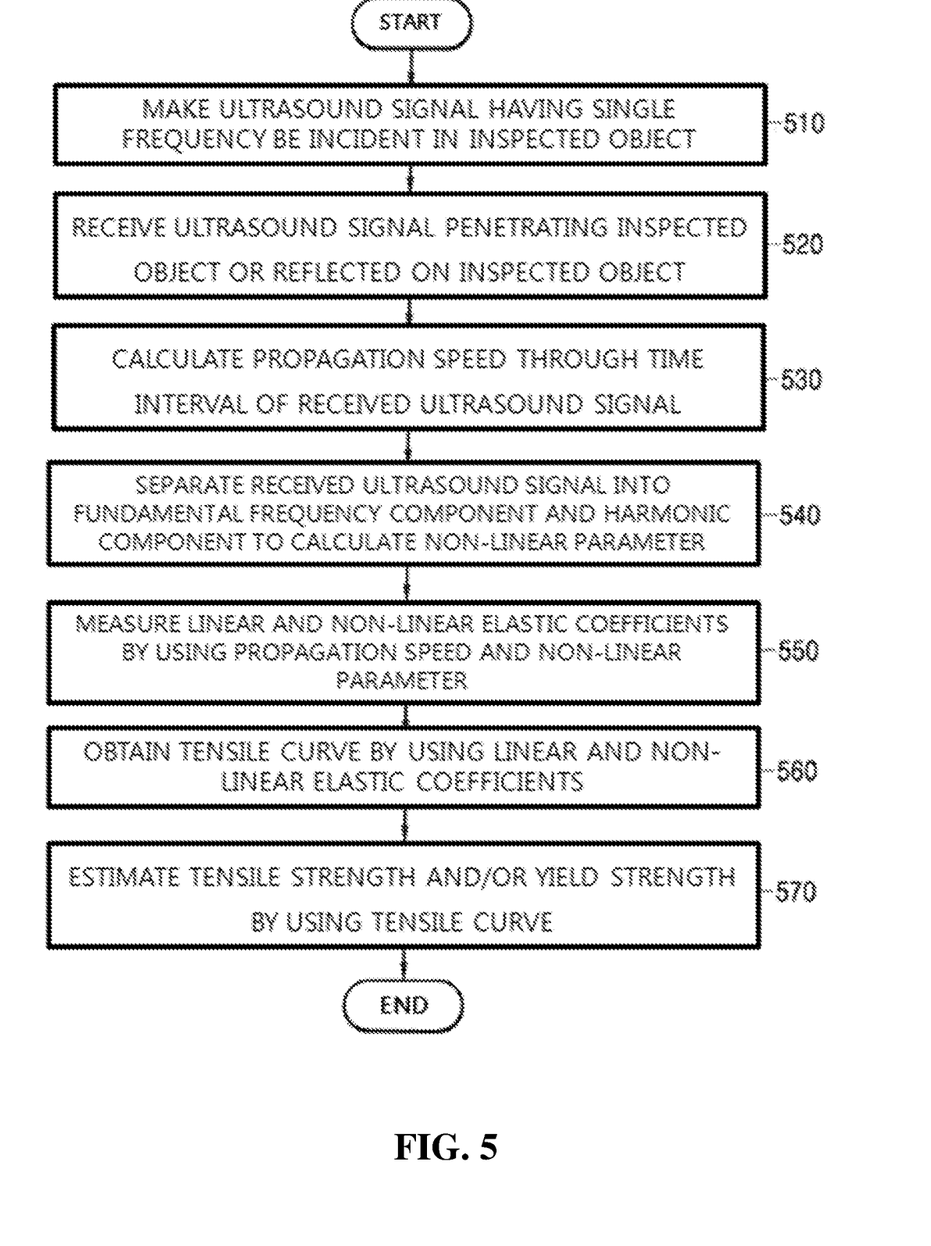
FIGS. 5 to 7 are flowcharts illustrated for describing a method for assessing degradation and estimating strength by using ultrasound according to an exemplary embodiment of the present disclosure.

FIG. 5 is a flowchart illustrated for describing a method for assessing degradation and estimating strength by using ultrasound according to an exemplary embodiment of the present disclosure. The method may be performed by the apparatus 100 for assessing degradation and estimating strength of FIG. 1.

Referring to FIG. 5, in step 510, the apparatus for assessing degradation and estimating strength makes the ultrasound signal having a single frequency be incident in the inspected object.

Next, in step 520, the apparatus for assessing degradation and estimating strength receives the ultrasound signal penetrating the inspected object or reflected on the inspected object.

Next, in step 530, the apparatus for assessing degradation and estimating strength calculates the propagation speed through the time interval of the received ultrasound signal.

Next, in step 540, the apparatus for assessing degradation and estimating strength separates the received ultrasound signal into the fundamental frequency component and the harmonic component to calculate the non-linear parameter.

Next, in step 550, the apparatus for assessing degradation and estimating strength measures the linear and non-linear elastic coefficients by using the propagation speed and the non-linear parameter.

Figure 6:
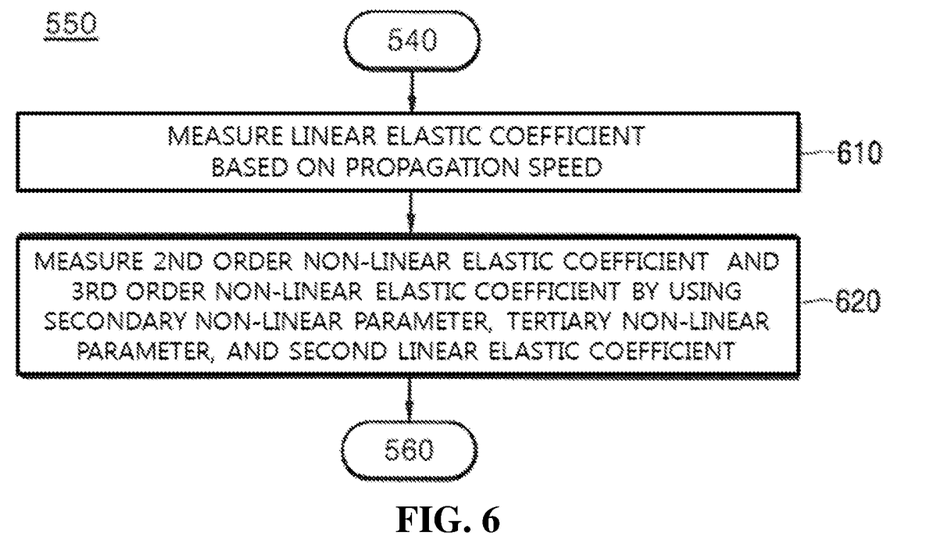

In detail, referring to FIG. 6, in step 610, the apparatus for assessing degradation and estimating strength may measure the linear elastic coefficient based on the propagation speed. Thereafter, in step 620, the apparatus for assessing degradation and estimating strength may measure the 2nd order non-linear elastic coefficient and the 3rd order non-linear elastic coefficient by using the 2nd order non-linear parameter, the 3rd order non-linear parameter, and the linear elastic coefficient.

Figure 7:
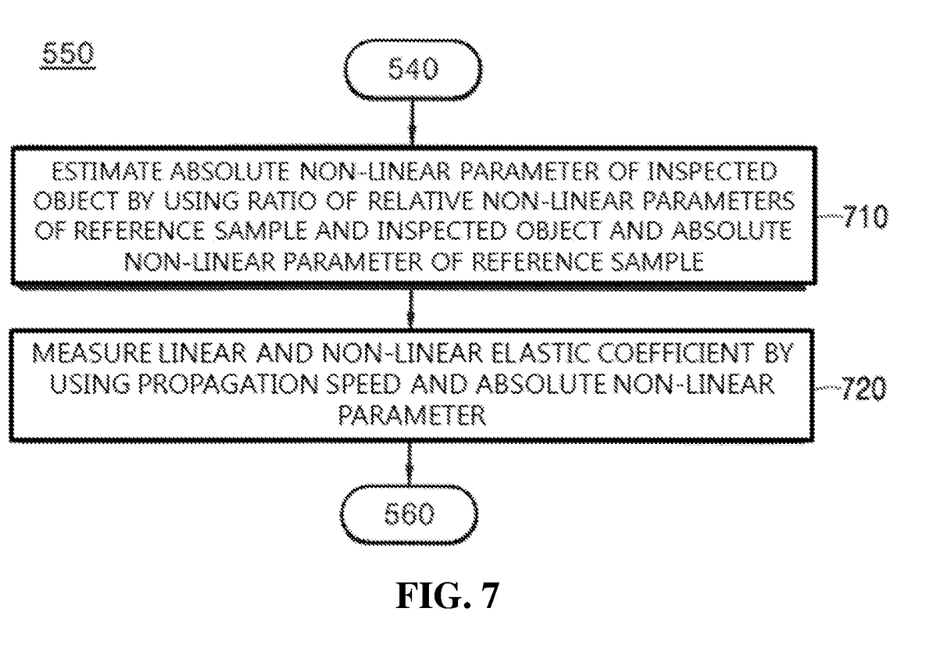

As another exemplary embodiment, referring to FIG. 7, in step 710, the apparatus for assessing degradation and estimating strength may estimate the absolute non-linear parameter of the inspected object by using the ratio of the relative non-linear parameters of the reference sample and the inspected object and the absolute non-linear parameter of the reference sample. Therefore, in step 720, the apparatus for assessing degradation and estimating strength may measure the linear and non-linear elastic coefficients by using the propagation speed and the absolute non-linear parameter.

Referring back to FIG. 5, in step 560, the apparatus for assessing degradation and estimating strength acquires the tensile curve by using the linear and non-linear elastic coefficients.

Next, in step 570, the apparatus for assessing degradation and estimating strength estimates the tensile strength and/or the yield strength by using the tensile curve.

Figure 8:
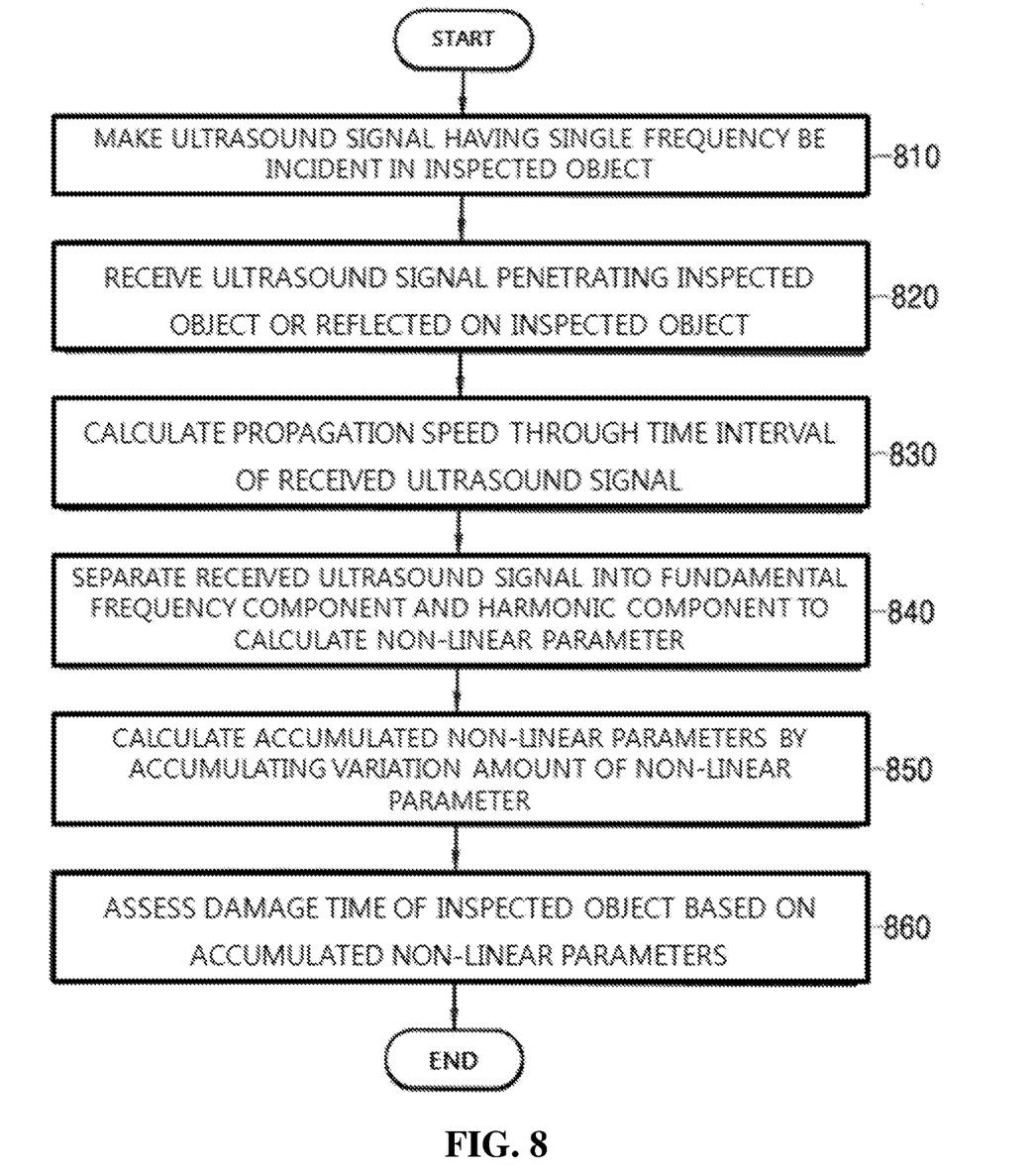
FIG. 8 is a flowchart illustrated for describing a method for assessing degradation and estimating strength by using ultrasound according to another exemplary embodiment of the present disclosure.

FIG. 8 is a flowchart illustrated for describing a method for assessing degradation and estimating strength by using ultrasound according to another exemplary embodiment of the present disclosure. The method may be performed by the apparatus 100 for assessing degradation and estimating strength of FIG. 1.

Referring to FIG. 8, in step 810, the apparatus for assessing degradation and estimating strength makes the ultrasound signal having the single frequency be incident in the inspected object.

Next, in step 820, the apparatus for assessing degradation and estimating strength receives the ultrasound signal penetrating the inspected object or reflected on the inspected object.

Next, in step 830, the apparatus for assessing degradation and estimating strength calculates the propagation speed through the time interval of the received ultrasound signal.

Next, in step 840, the apparatus for assessing degradation and estimating strength separates the received ultrasound signal into the fundamental frequency component and the harmonic component to calculate the non-linear parameter.

Next, in step 850, the apparatus for assessing degradation and estimating strength calculates the accumulated non-linear parameters by accumulating the variation amount of the non-linear parameter depending on the time.

Next, in step 860, the apparatus for assessing degradation and estimating strength assesses the damage time of the inspected object based on the accumulated non-linear parameters.

Although the exemplary embodiments of the present disclosure have been described in detail with reference to the accompanying drawings, the present disclosure is not limited thereto and may be embodied in many different forms without departing from the technical concept of the present disclosure. Therefore, the scope of the present disclosure should not be limited to the exemplary embodiment and should be defined by the appended claims and equivalents to the appended claims.

Although the present disclosure has been described by the limited exemplary embodiments and drawings, the present disclosure is not limited to the exemplary embodiments and various modifications and transformations can be made by those skilled in the art from the disclosure. The protective scope of the present disclosure should be construed based on the following claims, and all the technical concepts in the equivalent scope thereof should be construed as falling within the scope of the present disclosure.

The invention claimed is:

1. An apparatus for assessing degradation and estimating strength by using ultrasound, the apparatus comprising:
    an ultrasound transmitting unit making an ultrasound signal having a single frequency be incident to an inspected object;
    an ultrasound receiving unit receiving the ultrasound signal penetrating the inspected object or reflected on the inspected object;

a signal processing unit calculating a propagation speed through a time interval of the ultrasound signal received by the ultrasound receiving unit, separating the received ultrasound signal into a fundamental frequency component and a harmonic component to calculate a non-linear parameter, and measuring a linear elastic coefficient and a non-linear elastic coefficient by using the propagation speed and the non-linear parameter; and a strength estimating unit obtaining a tensile curve by using the linear elastic coefficient and the non-linear elastic coefficient and estimating at least one of tensile strength or yield strength by using the tensile curve, wherein the signal processing unit acquires an amplitude of the fundamental frequency component and an amplitude of the harmonic component, and calculates the non-linear parameter by using the amplitude of the fundamental frequency component and the amplitude of the harmonic component, wherein the signal processing unit measures at least one of a 2nd order non-linear parameter, a 3rd order non-linear parameter, or the linear elastic coefficient by controlling the ultrasound transmitting unit and the ultrasound receiving unit, wherein the ultrasound receiving unit measures a 2nd order non-linear elastic coefficient and a 3rd order non-linear elastic coefficient by using the 2nd order non-linear parameter, the 3rd order non-linear parameter, and the linear elastic coefficient, wherein the strength estimating unit obtains the tensile curve by using at least one of the linear elastic coefficient, the 2nd order non-linear elastic coefficient, and the 3rd order non-linear elastic coefficient or obtains the tensile curve by using the linear elastic coefficient, the 2nd order non-linear parameter, and the 3rd order non-linear parameter, and wherein the 2nd order non-linear elastic coefficient is measured by Equation given below, $$F = \beta E \quad \text{[Equation]}$$

where, F represents the 2nd order non-linear elastic coefficient, $\beta$ represents the 2nd order non-linear parameter, and E represents the linear elastic coefficient.

2. The apparatus of claim 1, wherein the strength estimating unit estimates the tensile strength from a maximum value of the tensile curve.

3. The apparatus of claim 1, wherein the strength estimating unit estimates the yield strength by applying 0.2% offset to the tensile curve.

4. The method of claim 1, wherein the 3rd order non-linear elastic coefficient is measured by Equation given below, $$G = \tfrac{1}{2}\gamma E = \tfrac{1}{2}\beta^2 E$$

where, G represents the 3rd order non-linear elastic coefficient and $\gamma$ represents the 3rd order non-linear parameter, E represents the linear elastic coefficient, and $\beta$ represents the 2nd order non-linear parameter.

5. The apparatus of claim 1, wherein the signal processing unit estimates an absolute non-linear parameter of the inspected object by using a ratio of relative non-linear parameters of a reference sample and the inspected object and an absolute non-linear parameter of the reference sample and measures the linear and non-linear elastic coefficients by using the propagation speed and the absolute non-linear parameter of the inspected object.

6. The apparatus of claim 5, wherein the ratio of the relative non-linear parameters is calculated through an operation of dividing the relative non-linear parameter of the inspected object by the relative non-linear parameters of the reference sample.

7. The apparatus of claim 1, further comprising:
a degradation assessing unit assessing a damage time of the inspected object based on an accumulated non-linear parameter calculated by accumulating a variation amount of the non-linear parameter.

8. The apparatus of claim 7, wherein the signal processing unit obtains the non-linear parameter of the ultrasound signal received by the ultrasound receiving unit depending on the time and accumulates the variation amount of the non-linear parameter to calculate the accumulated non-linear parameter.

9. A method for assessing degradation and estimating strength by using ultrasound, the method comprising:
making an ultrasound signal having a single frequency be incident in an inspected object;
receiving the ultrasound signal penetrating the inspected object or reflected on the inspected object;
calculating a propagation speed through a time interval of the received ultrasound signal;
calculating a non-linear parameter by separating the received ultrasound signal into a fundamental frequency component and a harmonic component;
measuring a linear elastic coefficient and a non-linear elastic coefficient by using the propagation speed and the non-linear parameter;
obtaining a tensile curve by using the linear elastic coefficient and the non-linear elastic coefficient; and
estimating at least one of tensile strength or yield strength by using the tensile curve,
wherein the calculating of the non-linear parameter comprises:
acquiring an amplitude of the fundamental frequency component and an amplitude of the harmonic component, and
calculating the non-linear parameter by using the amplitude of the fundamental frequency component and the amplitude of the harmonic component,
wherein the calculating of the non-linear parameter includes separating the received ultrasound signal into the fundamental frequency component and the harmonic component to calculate a 2nd order non-linear parameter and a 3rd order non-linear parameter,
wherein a 2nd order non-linear elastic coefficient and a 3rd order non-linear elastic coefficient is measured by using the 2nd order non-linear parameter, the 3rd order non-linear parameter, and the linear elastic coefficient,
wherein the tensile curve is obtained by using the linear elastic coefficient, the 2nd order non-linear elastic coefficient, and the 3rd order non-linear elastic coefficient or by using the linear elastic coefficient, the 2nd order non-linear parameter, and the 3rd order non-linear parameter, and
wherein the 2nd order non-linear elastic coefficient is measured by Equation given below, $$F = \beta E \quad \text{[Equation]}$$

where, F represents the 2nd order non-linear elastic coefficient, $\beta$ represents the 2nd order non-linear parameter, and E represents the linear elastic coefficient.

10. The method of claim 9, wherein the measuring of the linear and non-linear elastic coefficients includes measuring the linear elastic coefficient based on the propagation speed.

11. The method of claim 9, wherein the measuring of the linear and non-linear elastic coefficients comprises:
   estimating an absolute non-linear parameter of the inspected object by using a ratio of relative non-linear parameters of a reference sample and the inspected object and an absolute non-linear parameter of the reference sample, and
   measuring the linear and non-linear elastic coefficients by using the propagation speed and the absolute non-linear parameter of the inspected object.

12. The method of claim 9, wherein the estimating includes estimating the tensile strength from a maximum value of the tensile curve.

13. The method of claim 9, wherein the estimating includes estimating the yield strength by applying 0.2% offset to the tensile curve.

14. The method of claim 9, further comprising:
   calculating accumulated non-linear parameters by accumulating a variation amount of the non-linear parameter; and
   assessing a damage time of the inspected object based on the accumulated non-linear parameters.

\* \* \* \* \*